United States Patent
Ohara et al.

(10) Patent No.: US 7,081,202 B2
(45) Date of Patent: Jul. 25, 2006

(54) COMPOSITE SEMIPERMEABLE MEMBRANE, PRODUCTION METHOD THEREOF, AND WATER TREATMENT METHOD USING THE SAME

(75) Inventors: Tomomi Ohara, Ibaraki (JP); Masahiko Hirose, Ibaraki (JP); Naoki Kurata, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 93 days.

(21) Appl. No.: 10/296,836

(22) PCT Filed: Mar. 8, 2002

(86) PCT No.: PCT/JP02/02165

§ 371 (c)(1),
(2), (4) Date: May 6, 2003

(87) PCT Pub. No.: WO02/076594

PCT Pub. Date: Oct. 3, 2002

(65) Prior Publication Data

US 2003/0183576 A1   Oct. 2, 2003

(30) Foreign Application Priority Data

| Mar. 19, 2001 | (JP) | 2001-078490 |
| Mar. 22, 2001 | (JP) | 2001-081827 |
| Dec. 3, 2001 | (JP) | 2001-368578 |
| Dec. 3, 2001 | (JP) | 2001-368584 |
| Feb. 4, 2002 | (JP) | 2002-26767 |

(51) Int. Cl.
*B01D 63/00* (2006.01)
*B01D 71/56* (2006.01)
*B01D 61/00* (2006.01)

(52) U.S. Cl. ............... 210/500.38; 210/650; 210/652; 210/490

(58) Field of Classification Search ............... 210/650, 210/652, 490, 500.38
See application file for complete search history.

(56) References Cited

U.S. PATENT DOCUMENTS

| 5,051,178 A | * | 9/1991 | Uemura et al. ......... 210/500.38 |
| 5,160,619 A | | 11/1992 | Yamaguchi et al. |
| 5,254,261 A | | 10/1993 | Tomaschke et al. |

(Continued)

FOREIGN PATENT DOCUMENTS

CN      1070592 A      4/1993

(Continued)

*Primary Examiner*—John Kim
*Assistant Examiner*—Krishnan S Menon
(74) *Attorney, Agent, or Firm*—Knobbe Martens Olson & Bear, LLP (57) ABSTRACT

A composite semipermeable membrance of the present invention comprises a thin film and a porous support membrane supporting the thin film, wherein the thin film includes polyamide based resin having a constituent unit with amide bond between diamine residue and di or tri carboxylic acid residue, in which nitrogen atom of the amide bond has a substituent of aromatic ring. A production method of this invention includes a contacting step of contacting the above composite semipermeable membrane with solution including an oxidizer. In addition, a water treatment method of this invention comprises a step of separating a raw water by a composite semipermeable membrane to obtain permeation water in which salt and/or organic substance is removed sufficiently in practical use, characterized in that the composite semipermeable membrane of this invention is used and a fungicide is added into the raw water.

This invention provides a composite semipermeable membrane having practically permeability, and excellent desalting faculty and oxidizer resistance, a production method thereof, and water treatment method using the same.

26 Claims, 1 Drawing Sheet

U.S. PATENT DOCUMENTS

5,876,602 A  3/1999  Jons et al.

FOREIGN PATENT DOCUMENTS

| EP | 0 465 649 A1 | 1/1992 |
|----|--------------|--------|
| JP | 55-147106 | 11/1980 |
| JP | 62-121603 | 6/1987 |
| JP | 63-12310 | 1/1988 |
| JP | 63-218208 | 9/1988 |
| JP | 1-180208 | 7/1989 |
| JP | 2-187135 | 7/1990 |
| JP | 5-96140 | 4/1993 |
| JP | 5-146654 | 6/1993 |
| JP | 6-47260 | 2/1994 |
| JP | 6-205952 | 7/1994 |
| JP | 8-224452 | 9/1996 |
| JP | 2000-334280 | 12/2000 |
| JP | 2001-521808 | 11/2001 |

* cited by examiner

[FIG. 1]

COMPOSITE SEMIPERMEABLE MEMBRANE, PRODUCTION METHOD THEREOF, AND WATER TREATMENT METHOD USING THE SAME

This application is the U.S. National Phase under 35 U.S.C. §371 of International Application PCT/JP02/02 165, filed Mar. 8, 2002, which claims priority to Japanese Patent Application Nos. 2001-78490 filed Mar. 19, 2001, 2001-81827 filed Mar. 22, 2001, 2001-368578 filed Dec. 3, 2001, 2001-368584 filed Dec. 3, 2002, and 2002-26767 filed Feb. 4, 2002, respectively. The International Application was not published under PCT Article 21(2) in English.

BACKGROUND ART

1. Technical Field

The present invention relates to a composite semipermeable membrane for separating a component of a liquid mixture selectively, a method for producing the same, and a water-treating method using the composite semipermeable membrane. The present invention particularly relates to a composite semipermeable membrane comprising a thin film made mainly of a polyamide on a porous base material and having practical water flux, desalting faculty and endurance, and a water-treating method using the composite semipermeable membrane.

2. Technical Background

As semipermeable membranes used for purposes described above, there are known asymmetrical membranes wherein asymmetrical structures are made of the same material by a phase-separating method and composite semipermeable membranes wherein a thin film which is made of different materials and has a selective separability is formed on a porous base material.

As the latter semipermeable membranes, suggested are a great number of composite semipermeable membranes wherein a thin film made of a polyamide obtained by interfacial polymerization of a polyfunctional aromatic amine and a polyfunctional aromatic acid halide is formed on a porous base material (for example, JP-A Nos. S55-147106, S62-121603, S63-218208, H2-187135, and so on). Suggested are also composite semipermeable membranes wherein a thin film made of a polyamide obtained by interfacial polymerization of a polyfunctional aromatic amine and a polyfunctional alicyclic acid halide is formed on a porous base material (for example, JP-A No. S61-42308, and so on).

In order to improve the water flux of the above-mentioned composite semipermeable membranes further, additives are suggested. There are known substances capable of removing hydrogen halide generated by interfacial reaction, such as sodium hydroxide or trisodium phosphate; known acylating catalysts; compounds for decreasing the interfacial tension on a reaction field at the time of interfacial reaction; and so on (for example, JP-A Nos. S63-12310, H6-47260, H8-224452 and so on).

For these semipermeable membranes, endurance such that various oxidizers can be resisted, in particular, washing with chlorine can be resisted is demanded in light of more stable operability in various water treatment plants, a typical example of which is a water-producing plant, and pursuit of low costs based on prolongation of the lifespan of the membranes. It is said that the polyamide-based semipermeable membranes exemplified above have practical oxidizer resistance. It is not, however, said that all of them have resistance having such a level that constant or intermittent chlorine-sterilization can be resisted for a long time. It is therefore desired to develop semipermeable membranes having both of a higher oxidizer resistance and practical water flux and desalting faculty.

For these purposes, suggested are a composite membrane obtained from a diamine having only a secondary amino group (JP-A No. S55-139802), a composite membrane obtained using an aliphatic diamine or alicyclic diamine (JP-A Nos. S58-24303, S59-26101, S59-179103, H1-180208, and H2-78428), a composite membrane having a diphenylsulfone structure (JP-A Nos. S62-176506, S62-213807 and S62-282603), a membrane to which a chlorine-resistance is given by post-treatment (JP-A No. H5-96140), and so on.

However, these membranes do not have water flux, desalting faculty or oxidizer resistance which are required for practical semipermeable membranes. Thus, higher properties are demanded. In other words, it is known that in polyamide based reverse osmotic membranes, polyamides obtained using an aliphatic diamine whose main chain does not any aromatic ring are superior in oxidizer resistance, as described above, but the desalting faculty and water flux of the reverse osmotic membranes are not sufficiently satisfied.

The above-mentioned JP-A No. H1-180208 discloses a production process comprising the step of immersing a polyamide based composite semipermeable membrane obtained using both a polyfunctional aromatic amine and an aliphatic diamine into an aqueous chlorine-containing solution having a pH of 6 to 13. However, the publication never suggests what kind of other composite semipermeable membranes this process can be applied to.

Thus, an object of the present invention is to provide a composite semipermeable membrane having both practical water flux and superior desalting faculty and oxidizer resistance, a method for producing the same, and a water-treating method which makes it possible to exhibit practical water flux and superior desalting faculty and oxidizer resistance, using the same.

DISCLOSURE OF THE INVENTION

The inventors made eager investigations repeatedly to attain the above-mentioned object. As a result, the inventors have found out that by causing a polyamide base resin for forming a thin film to have an aromatic ring in a substituent on the nitrogen atom in the amide bond thereof, the resin has a higher desalting faculty than resins wherein such a substituent is an alkyl group and resins not having such a substituent. The inventors have also found out that by bringing a composite semipermeable membrane having such a thin film into contact with an aqueous oxidizer solution, water flux can be drastically improved without lowering the performance of blocking various solutes. Thus, the present invention has been made.

That is, a composite semipermeable membrane of the present invention is a composite semipermeable membrane comprising a thin film and a porous support membrane for supporting this, characterized in that the thin film comprises a polyamide based resin having a constituent unit represented by the following general formulas (I) and/or (II):

(I)

wherein $R_{11}$ represents an alkylene group which has 2 to 10 carbon atoms and may contain —O—, —S—, or —NR—, wherein R represents a hydrogen atom or a lower alkyl group, $R_{12}$ and $R_{13}$ each independently represent an aromatic hydrocarbon group which may have a substituent, or a hydrogen atom, at least one of $R_{12}$ or $R_{13}$ represents an aromatic hydrocarbon group which may have a substituent, and $R_{14}$ represents a bivalent organic group, and (II)

wherein $R_{21}$ represents an alkylene group which has 2 to 10 carbon atoms and may contain —O—, —S—, or —NR—, wherein R represents a hydrogen atom or a lower alkyl group, $R_{22}$ and $R_{23}$ each independently represent an aromatic hydrocarbon group which may have a substituent, or a hydrogen atom, at least one of $R_{22}$ or $R_{23}$ represents an aromatic hydrocarbon group which may have a substituent, and $R_{24}$ represents a trivalent organic group.

A composite semipermeable membrane of the present invention is preferably a composite semipermeable membrane comprising a thin film and a porous support membrane for supporting this, wherein the thin film comprises a polyamide based resin having a constituent unit represented by the following general formulas (Ia) and/or (IIa):

(Ia)

wherein $R_{31}$ represents an alkylene group which has 2 to 10 carbon atoms and may contain —O—, —S—, or —NR—, wherein R represents a hydrogen atom or a lower alkyl group, $R_{32}$ and $R_{33}$ each independently represent a phenyl group, or a hydrogen atom, at least one of $R_{32}$ or $R_{33}$ represents a phenyl group, and $R_{34}$ represents a bivalent organic group, and (IIa)

wherein $R_{41}$ represents an alkylene group which has 2 to 10 carbon atoms and may contain —O—, —S—, or —NR—, wherein R represents a hydrogen atom or a lower alkyl group, $R_{42}$ and $R_{43}$ each independently represent a phenyl group, or a hydrogen atom, at least one of $R_{42}$ or $R_{43}$ represents a phenyl group, and $R_{44}$ represents a trivalent organic group.

A composite semipermeable membrane of the present invention is preferably a composite semipermeable membrane comprising a thin film and a porous support membrane for supporting this, characterized in that the thin film comprises a polyamide based resin having a constituent unit obtained by condensation reaction of a diamine component represented by the following general formula (III) and a polyfunctional acid halide having 2 or more valences.

(III)

wherein $R_{51}$ represents an alkylene group which has 2 to 10 carbon atoms and may contain —O—, —S—, or —NR—, wherein R represents a hydrogen atom or a lower alkyl group, $R_{52}$ and $R_{53}$ each independently represent an aromatic hydrocarbon group which may have a substituent, or a hydrogen atom, at least one of $R_{52}$ or $R_{53}$ represents an aromatic hydrocarbon group which may have a substituent.

The method for producing a composite semipermeable membrane of the present invention comprises a contact step of bringing any one of the above-mentioned composite semipermeable membranes into contact with an aqueous oxidizer solution. Another composite semipermeable membrane of the present invention is a membrane obtained by this production process.

The water-treating method of the present invention is a water-treating method of subjecting water containing a salt and/or an organic substance, as raw water, to membrane-separation treatment with a composite semipermeable membrane to obtain permeation water wherein the salt and/or the organic substance is/are sufficiently removed in practice, characterized in that as the composite semipermeable membrane, any one of the above-mentioned composite semipermeable membranes is used, and further a fungicide is added to the raw water.

BEST EMBODIMENTS FOR CARRYING OUT THE INVENTION

Best embodiments for carrying out the present invention will be described hereinafter.

[Composite Semipermeable Membrane]

The composite semipermeable membrane of the present invention is a composite semipermeable membrane comprising a thin film and a porous support membrane for supporting this, characterized in that the thin film comprises a polyamide based resin having a constituent unit represented by the above-mentioned general formulae (I) to (IIa). The composite semipermeable membrane is also characterized in that the thin film comprises a polyamide based resin having a constituent unit obtained by condensation reaction of a diamine composition represented by the above-mentioned general formulae (III) to (IIIa) and a polyfunctional acid halide having bivalent or more.

$R_{11}$, $R_{21}$, $R_{31}$, $R_{41}$, $R_{51}$ and $R_{61}$, in the general formulae (I) to (IIIa) each represent an alkylene group which has 2 to 10 carbon atoms and may contain —O—, —S—, or —NR—, wherein R represents a hydrogen atom or a lower alkyl group (having 1 to 4 carbon atoms). Specific examples thereof include —$C_2H_4$—, —$C_3H_6$—, —$C_4H_8$—, —$C_5H_{10}$—, —$C_6H_{12}$—, —$C_7H_{14}$—, —$C_8H_{16}$—, —$C_9H_{18}$—, —$C_{10}H_{20}$—, —$CH_2OCH_2$—, —$CH_2OCH_2OCH_2$—, —$C_2H_4OCH_2$—, —$C_2H_4OC_2H_4$—, —$CH_2SCH_2$—, —$CH_2SCH_2SCH_2$—, —$C_2H_4SCH_2$—, —$C_2H_4SC_2H_4$—, —$C_2H_4NHC_2H_4$—, and —$C_2H_4N(CH_3)C_2H_4$—. Alkylene groups which do not contain any heteroatom are particularly preferred from the viewpoints of a further improvement in oxidizer resistance, reactivity at the time of forming a film, the desalting faculty of the formed film, and so on.

$R_{12}$, $R_{13}$, $R_{22}$, $R_{23}$, $R_{32}$, $R_{33}$, $R_{42}$, $R_{43}$, $R_{52}$, $R_{53}$, $R_{62}$ and $R_{63}$ are each independently an aromatic hydrocarbon group which may have a substituent, or a hydrogen atom. However, at least one of $R_{12}$ or $R_{13}$ is an aromatic hydrocarbon group which may have a substituent. The same matter is also applied to the other combinations. Specific examples thereof include H, —$C_6H_5$, —$CH_2C_6H_5$, —$C_6H_4OH$, —$C_6H_4CH_3$, —$C_6H_4NO_2$, and —$C_6H_4Cl$. From the viewpoints of water flux of the formed film, desalting faculty, and so on, a phenyl group which may have a substituent is preferred, and —$C_6H_5$ is particularly preferred. Accordingly, at least one of $R_{32}$ or $R_{33}$ is preferably —$C_6H_5$, and only one thereof is more preferably —$C_6H_5$. The same matter is also applied to $R_{42}$ or $R_{43}$.

In the present invention, the above-mentioned diamine component is preferably a compound represented by the following general formula (IIIa):

(IIIa)

wherein $R_{61}$ represents an alkylene group which has 2 to 10 carbon atoms and may contain —O—, —S—, or —NR—, wherein R represents a hydrogen atom or a lower alkyl group, $R_{62}$ and $R_{63}$ are each independently a phenyl group or a hydrogen atom, and at least one of $R_{62}$ or $R_{63}$ is a phenyl group.

$R_{14}$, $R_{24}$, $R_{34}$ and $R_{44}$ in the general formulas (I) to (IIa) are each a bivalent or trivalent organic group, and correspond to a residue group of a polyfunctional acid halide which has two or more valences and forms the thin film of the present invention by condensation reaction with the diamine component represented by the general formula (III) or (IIIa). The polyfunctional acid halide is not particularly limited. Examples thereof include propanetricarboxylic acid chloride, butanetricarboxylic acid chloride, pentanetricarboxylic acid chloride, glutaryl halide, adipoyl halide, cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride. From the viewpoints of reactivity, the desalting faculty of the formed film, the water flux thereof and so on, polyfunctional aromatic acid halides are preferred. Examples of such polyfunctional aromatic acid halides include trimesic acid chloride, trimellitic acid chloride, terephthalic acid chloride, isophthalic acid chloride, pyromellitic acid chloride, biphenyldicarboxylic acid chloride, naphthalenedicarboxylic acid dichloride, benzenetrisulfonic acid chloride, benzenedisulfonic acid chloride, and chlorosulfonylbenzenedicarboxylic acid chloride.

The polyamide base resin in the present invention preferably has a crosslink structure. In this case, a polyfunctional acid halide having trivalent or more is preferably used. In the case of using the polyfunctional acid halide having three or more valences, the crosslinked moiety thereof is made of a constituent unit represented by the general formula (II). In the case that a non-crosslinked moiety is present, it is made of a constituent unit represented by the general formula (I) and $R_{14}$ is made of a bivalent organic group in which a carboxylic group or a salt thereof remains. The same matter is applied to relationship between the general formula (IIa) and the general formula (Ia).

The polyamide based resin which makes the above-mentioned film may be a homopolymer, or a copolymer containing a plurality of the above-mentioned constituents units or a different constituent unit, or a blend comprising a plurality of the homopolymers. Examples thereof include polyamide based resins having the constituent unit represented by the general formula (I) and having the constituent unit represented by the general formula (II). Examples of the different constituent unit include a diamine component containing, in its main chain, an aromatic ring, a diamine component containing, in its side chain, no aromatic ring, and other diamine components used in polyamide based semipermeable membranes.

The polyamide based resin in the present invention comprises the constituent unit(s) represented by the general formulas (I) and/or (II) or the general formulas (Ia) and/or (IIa) preferably at a ratio of 50% or more by mole, more preferably at a ratio of 80% or more by mole. If the ratio is less than 50% by mole, the effect of the aromatic ring in the substituent on the nitrogen atom of the amide bond becomes small so that practical water flux and superior desalting faculty and oxidizer resistance trend not to be simultaneously satisfied.

The thickness of the thin film (separation active layer) in the present invention, which depends on the process for producing the thin film, is preferably from 0.01 to 100 μm, more preferably from 0.1 to 10 μm. As the thickness is smaller, a better result is caused from the viewpoint of permeation flux. However, if the thickness is too small, mechanical strength of the thin film lowers so that defects are easily generated. Thus, a bad effect is produced on the desalting faculty.

The porous support membrane for supporting the thin film in the present invention is not particularly limited if it can support the thin film. Examples thereof include films of various substances such as polysulfone, polyarylether sulfone such as polyether sulfone, polyimide and polyfluoride vinylidene. In particular, from the viewpoints of chemical, mechanical and thermal stabilities a porous support membrane made of polysulfone or polyarylether sulfone is preferably used. Such a porous support membrane usually has a thickness of about 25 to 125 μm, and preferably has a thickness of about 40 to 75 μm. However, the thickness is not necessarily limited to such a thickness.

The porous support membrane may have a symmetrical structure or an asymmetrical structure. However, the asymmetrical structure is preferred to satisfy both of the supporting function of the thin film and liquid-passing property. The average pore size of the thin film formed side of the porous support membrane is preferably from 1 to 1000 μm.

When the thin film in the present invention is formed on the porous support membrane, the method thereof is not limited at all. Any known method can be used. Examples thereof include interfacial condensation, phase separation and thin-film coating methods. Particularly preferred is an interfacial condensation method of applying an aqueous solution containing a diamine component onto the porous support membrane and then bringing the porous support membrane into contact with a nonaqueous solution containing a polyfunctional acid halide to form a thin film on the porous support membrane. Details of conditions and so on of this interfacial condensation method are described in JP-A Nos. S58-24303, H1-180208 and so on. These known techniques can be appropriately adopted.

In order to make the film-formation easy or improve the performance of the resultant composite semipermeable membrane, various reagents can be caused to be present in the reaction field. Examples of the reagents include polymers such as polyvinyl alcohol, polyvinyl pyrrolidone and polyacrylic acid; polyhydric alcohols such as sorbitol and glycerin; amine salts such as salts of tetraalkylammonium halide or trialkylammonium and an organic acid, which are described in JP-A No. 2-187135; surfactants such as sodium dodecylbenzenesulfonate, sodium dodecylsulfate and sodium laurylsulfate; sodium hydroxide, trisodium phosphate, triethylamine and camphorsulfonic acid, which can remove hydrogen halide generated by condensation polymerization reaction; known acylating catalysts; and compounds having a solubility parameter of 8 to 14 $(cal/cm^3)^{1/2}$, which are described in JP-A No. 8-224452.

[Method for Producing a Composite Semipermeable Membrane]

The following will describe the production method of the present invention. The method for producing a composite semipermeable membrane of the present invention is characterized by comprising a contact step of bringing a composite semipermeable membrane as described above into contact with an aqueous oxidizer solution.

The used oxidizer is a substance which usually has oxidizing effect, and is not limited at all if it is generally used in the form of an aqueous solution. Examples thereof include permanganic acid, permanganates, chromic acid, chromate, nitric acid, nitrates, peroxides such as hydrogen peroxide, sulfuric acid, hypochlorites, and hypobromites. From the viewpoints of costs, handling performance and so on, hypochlorite, in particular, sodium hypochlorite is preferred.

The production method of the present invention preferably comprises the step of bringing a composite semipermeable membrane described above into contact with an aqueous oxidizer solution containing a metal salt. By catalytic effect of the metal salt, the time for the contact with the above-mentioned oxidizer solution can be made short. Examples of the metal salt used herein may be alkali metal salts, alkali earth metal salts, and transition metal salts, and include lithium chloride, potassium chloride, magnesium chloride, magnesium nitrate, calcium nitrate, iron chloride, copper chloride and calcium chloride. Metal chlorides are preferred.

The concentration of the metal salt in the aqueous solution is decided in light of the effect of increasing permeation flux by contact in a short time. For example, in the case that sodium hypochlorite is used as the oxidizer, the concentration thereof can be set to 0.001 to 50% by weight, preferably 0.05 to 5% by weight. If the concentration of the inorganic salt is less than 0.001% by weight, a time required for obtaining desired effects is too large. Thus, such a concentration is not practical in the production. Alternatively, desired effects cannot be obtained within a time permissible in the production. If the concentration of the inorganic salt is more than 50% by weight, a deterioration in the film, such as a decrease in the desalting faculty of the composite film, is unfavorably caused.

In the present invention, as the method for bringing the aqueous oxidizer solution into contact with the composite film, all methods such as immersion, solution-transmitting under applied pressure, spray, coating and showering can be given as examples. In order to give sufficient effects by the contact, immersion under normal pressure or solution-transmitting under applied pressure is preferred. Specifically, it is advisable to perform a method of immersing the composite semipermeable membrane to the aqueous oxidizer solution under normal pressure, or a method of transmitting the aqueous oxidizer solution to the composite semipermeable membrane under applied pressure.

When the contact of the aqueous oxidizer solution is performed by the immersion under normal pressure or the solution-transmitting method under applied pressure, the concentration of the oxidizer in this aqueous solution can be decided in light of desired effects. For example, in the case that sodium hypochlorite is used as the oxidizer, the concentration thereof can be set to 1 mg/L to 10%, preferably 10 mg/L to 1% as a free chlorine concentration. If the free chlorine concentration is less than 1 mg/L, a time required for obtaining desired effects is too large. Thus, such a concentration is not practical in the production. Alternatively, desired effects cannot be obtained within a time permissible in the production. If the free chlorine concentration is more than 10% by weight, a deterioration in the film, such as a decrease in the desalting faculty of the composite film, is unfavorably caused.

When the contact of the aqueous oxidizer solution is performed, the contact temperature is also decided in light of the effect of increasing permeation flux by contact in a short time. For example, in the case that sodium hypochlorite is used as the oxidizer, the concentration can be set to 5 to 60° C., preferably 25 to 60° C. If the contact temperature is less than 5° C., a time required for obtaining desired effects is too large. Thus, such a temperature is not practical in the production. Alternatively, desired effects cannot be obtained within a time permissible in the production. If contact temperature is more than 60° C., a deterioration in the film, such as a decrease in the desalting faculty of the composite film, is unfavorably caused.

When the contact of the aqueous oxidizer solution is performed by the immersion under normal pressure or the solution-transmitting method under applied pressure, the contact time is not limited at all and can be set to an arbitrary time if it gives desired effects and is within a range permitted by restriction in the production.

When the contact of the aqueous oxidizer solution is performed by the solution-transmitting method under applied pressure, the pressure for supplying this aqueous solution to the composite film is not limited at all within a range permitted by physical strengths of the composite film, and a member and equipment for giving the pressure. The contact can be performed within the range of, for example, 0.01 MPa to 10 MPa.

When these treatments, that is, the immersion under normal pressure and the solution-transmitting method under applied pressure are performed, the shape of the composite film is not limited at all. In other words, the treatments can be conducted using all film shapes which can be considered, such as a flat film shape or a spiral element form.

[Water-treating Method Using the Composite Semipermeable Membrane]

The composite semipermeable membrane of the present invention has a characteristic of improving oxidizer resistance to a great extent. Therefore, in the method of subjecting raw water containing a salt and/or an organic substance to membrane-separation treatment with this composite semipermeable membrane to obtain permeation water wherein the salt and/or the organic substance is/are sufficiently removed in practice, an oxidizer having an effect as a fungicide is added to the raw water and then water treatment can be performed. Moreover, by the great improvement in oxidizer resistance, water treatment can be suitably performed even when the fungicide is present, at a concentration having a sufficient sterilizing effect, in the permeation water undergoing the membrane-separation treatment.

The oxidizer may be added constantly or intermittently during the water treatment operation by means of the composite film. The addition may be performed by stopping the water treatment operation and sealing composite film modules with the raw water containing the oxidizer for a given time.

According to the oxidizer, the effect of suppressing contamination of the film can be expected by the sterilizing effect thereof. Examples thereof include hypochlorites such as sodium hypochlorite and calcium hypochlorite, hydrogen peroxide water, sulfuric acid, and nitric acid. From the standpoints of sterilizing effect and handling performance, hypochlorites such as sodium hypochlorite is preferably used. In the case that the oxidizer is added to the raw water in this way, the pH of the solution may be adjusted or may not be adjusted.

The water-treating method of the present invention can be suitably used for purposes for giving advantages such that contamination of the film is suppressed by incorporating the oxidizer having sterilizing effect into the raw water. Examples thereof include sterilization of an aseptic water system, removal of activated carbon from a drinking-water producing system, disposal of waste of liquid for washing container or the like, and a system for cleaning up water in a pool. However, the purposes are not limited to these examples. In the case that the raw water in the water-treating method is waste liquid after a drinking water container is washed with washing liquid, the present invention is particularly effective since the sterilization with the oxidizer produces a large effect of heightening the stability of the water treatment.

According to the water-treating method of the present invention, practical water flux and superior desalting faculty can be exhibited since the composite semipermeable membrane of the present invention is used. Moreover, the film also has oxidizer resistance; therefore, water treatment can be performed in the state that a fungicide is added to the raw water. At this time, by the addition of the fungicide, contamination of the film is suppressed by the sterilizing effect so that the durability and the maintainability of membrane-separation become particularly good.

EXAMPLES

The following will describe Examples demonstrating the structure and the effects of the present invention.

Example 1-1

An aqueous solution containing 3% by weight of N-phenylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking the salt was 99.3%. The permeation flux was 0.32 $m^3/(m^2 \cdot day)$. Under the same conditions, a test about ammonium nitrate was made. As a result, the blocking rate was 95.0%.

This membrane was immersed into an aqueous sodium hypochlorite solution having a free chlorine concentration of 100 mg/L. After 100 hours, tests were made under the same conditions. As a result, the rate of blocking salt was 99.0%, and the permeation flux was 0.38 $m^3/(m^2 \cdot day)$. The rate of blocking ammonium nitrate was 94.0%.

Example 1-2

An aqueous solution containing 4% by weight of N-phenylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isoparaffin based mixed solution (IP Solvent, made by Idemitsu Petrochemical Co., Ltd.) containing 0.25% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 98.9%. The permeation flux was 0.33 $m^3/(m^2 \cdot day)$. Under the same conditions, a test about ammonium nitrate was made. As a result, the blocking rate was 95.3%.

This membrane was immersed into an aqueous sodium hypochlorite having a free chlorine concentration of 100 mg/L. After 100 hours, tests were made under the same conditions. As a result, the rate of blocking salt was 99.5%, and the permeation flux was 0.41 $m^3/(m^2 \cdot day)$. The rate of blocking ammonium nitrate was 95.7%.

Comparative Example 1-1

A composite semipermeable membrane was produced and tests were made in the very same way as in Example 1-1 except that the diamine component was changed to m-phenylenediamine. The results are shown in Table 1. Performances of the membrane wherein m-phenylenediamine was used as the amine component in this way were markedly lowered by immersing the membrane into the aqueous sodium hypochlorite solution.

Comparative Example 1-2

A composite semipermeable membrane was produced and tests were made in the same way as in Example 1-1 except that the diamine component was changed to ethylenediamine. The results are shown in Table 1. The permeation flux of the membrane wherein ethylenediamine was used as the amine component in this way was insufficient.

Comparative Example 1-3

A composite semipermeable membrane was produced and tests were made in the very same way as in Example 1-1 except that the diamine component was changed to N-methylethylenediamine. The results are shown in Table 1. About the membrane wherein N-methylethylenediamine was used as the amine component in this way, the rates of blocking salt and ammonium nitrate were insufficient.

Comparative Example 1-4

A composite semipermeable membrane was produced and tests were made in the very same way as in Example 1-1 except that the diamine component was changed to N-ethylethylenediamine. The results are shown in Table 1. About the membrane wherein N-ethylethylenediamine was used as the amine component in this way, the rates of blocking salt and ammonium nitrate were insufficient.

TABLE 1

| No. | | Before immersion | | After immersion | |
| --- | --- | --- | --- | --- | --- |
| | | Salt | Ammonium nitrate | Salt | Ammonium nitrate |
| Example 1 | Blocking rate (%) | 99.3 | 95.0 | 99.0 | 94.0 |
| | Permeation flux ($m^3/m^2/d$) | 0.32 | — | 0.38 | — |
| Example 2 | Blocking rate (%) | 98.9 | 95.3 | 99.5 | 95.7 |
| | Permeation flux ($m^3/m^2/d$) | 0.33 | — | 0.41 | — |
| Comparative Example 1 | Blocking rate (%) | 99.5 | 98.8 | 95.3 | 76.0 |
| | Permeation flux ($m^3/m^2/d$) | 1.23 | — | 4.45 | — |
| Comparative Example 2 | Blocking rate (%) | 98.5 | 93.0 | 97.8 | 92.4 |
| | Permeation flux ($m^3/m^2/d$) | 0.12 | — | 0.16 | — |
| Comparative Example 3 | Blocking rate (%) | 83.9 | 54.3 | 91.3 | 73.3 |
| | Permeation flux ($m^3/m^2/d$) | 0.72 | — | 0.56 | — |
| Comparative Example 4 | Blocking rate (%) | 91.5 | 68.7 | 94.5 | 70.6 |
| | Permeation flux ($m^3/m^2/d$) | 0.75 | — | 0.60 | — |

As can be understood from comparison of Comparative Examples 1-2 to 1-4 with Examples 1-1 to 1-2 about the results thereof, it is demonstrated that when an aromatic ring is present as a substituent on the nitrogen of the amino group, the rate of blocking solutes such as salt becomes very high.

Example 1-3

An aqueous solution containing 2% by weight of N-phenylethylenediamine, 0.15% by weight of sodium laurylsulfate, 2% by weight of triethylamine, and 4% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.15% by weight of trimesic acid chloride was brought into contact with the surface of the support membrane to cause an interfacial condensation polymerization reaction. Thereafter, the resultant was dried at 120° C. for 5 minutes to form a polymer thin film (thickness: 1 μm) on the porous support membrane. Thus, a composite semipermeable membrane was obtained.

This composite membrane was continuously operated at an operation pressure of 1.5 MPa, using raw water containing sodium hypochlorite having a free chlorine concentration of 100 mg/L. The transitions of the permeation flux and the salt-blocking rate of the composite membrane at this time are shown in FIG. 1.

Comparative Example 1-5

The composite membrane obtained in Comparative Example 1-1 was continuously operated at an operation pressure of 1.5 MPa, using raw water containing sodium hypochlorite having a free chlorine concentration of 100 mg/L. The transition of the salt-blocking rate of the composite membrane at this time is shown in FIG. 1.

Figure 1:
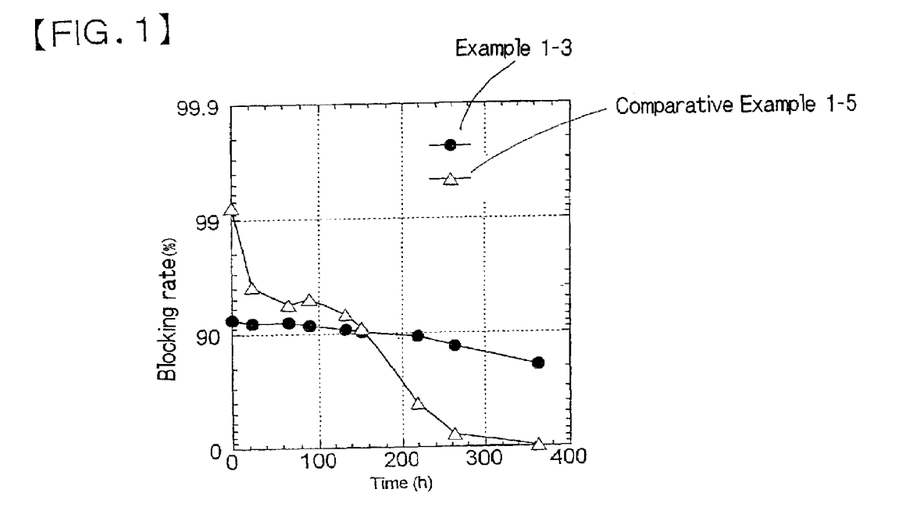
FIG. 1 is a graph showing a change in salt-blocking rate with the passage of time in Examples 1–3 and Comparative Examples 1–5.

As shown by the results from FIG. 1, in Example 1-3 of the present invention, the initial blocking rate was able to be maintained for a long time. However, in Comparative Example 1-5, the membrane was deteriorated by sodium hypochlorite so that the blocking rate dropped suddenly.

Reference Example 1-1

An aqueous solution containing 3% by weight of N-benzylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 50.4%. The permeation flux was 0.25 $m^3/(m^2 \cdot day)$. Under the same conditions, a test about ammonium nitrate was made. As a result, the blocking rate was 45.2%.

This membrane was immersed into an aqueous sodium hypochlorite solution having a free chlorine concentration of 100 mg/L. After 100 hours, tests were made under the same conditions. As a result, the rate of blocking salt was 61.1%, and the permeation flux was 1.06 m$^3$/(m$^2$/day). The rate of blocking ammonium nitrate was 60.1%.

Reference Example 1-2

An aqueous solution containing 2% by weight of N,N'-diphenylethylenediamine, 0.10% by weight of sodium laurylsulfate, 2% by weight of triethylamine, 4% by weight of camphorsulfonic acid and 30% by weight of acetonitrile was brought into contact with a porous polysulfonic support membrane (average pore size on a thin film formed side: 20 nm, asymmetrical film). Thereafter, an excess of the aqueous solution was removed. Next, an isooctane solution containing 0.5% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 67.7%. The permeation flux was 0.25 m$^3$/(m$^2$/day). Under the same conditions, a test about ammonium nitrate was made. As a result, the blocking rate was 65.5%.

This membrane was immersed into an aqueous sodium hypochlorite solution having a free chlorine concentration of 100 mg/L. After 100 hours, tests were made under the same conditions. As a result, the rate of blocking salt was 61.3%, and the permeation flux was 0.26 m$^3$/(m$^2$/day). The rate of blocking ammonium nitrate was 61.8%.

Reference Example 1-3

An aqueous solution containing 3% by weight of N,N'-dibenzylethylenediamine, 0.10% by weight of sodium laurylsulfate, 3% by weight of triethylamine, 6% by weight of camphorsulfonic acid and 20% by weight of acetonitrile was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 80.8%. The permeation flux was 0.15 m$^3$/(m$^2$/day). Under the same conditions, a test about ammonium nitrate was made. As a result, the blocking rate was 71.2%.

This membrane was immersed into an aqueous sodium hypochlorite solution having a free chlorine concentration of 100 mg/L. After 100 hours, tests were made under the same conditions. As a result, the rate of blocking salt was 80.2%, and the permeation flux was 0.16 m$^3$/(m$^2$/day). The rate of blocking ammonium nitrate was 69.6%.

Example 2-1

An aqueous solution containing 3% by weight of N-phenylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was immersed into an aqueous sodium hypochlorite solution having a free chlorine concentration of 100 mg/L at ambient temperature for 50 hours. Thereafter, the membrane was taken out from this aqueous solution, and tested at 25° C., pH of 7, and a pressure of 1.5 MPa, using 0.15% salt water as raw water. As a result, the rate of blocking salt was 99.0%. The permeation flux was 0.82 m$^3$/(m$^2$·day).

Example 2-2

An aqueous solution containing 3% by weight of N-phenylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. Thereafter, the resultant was held in a hot-window drier at 120° C. for 3 minutes to form a polymer thin film (thickness: 1 μm) on the porous support membrane. Thus, a composite semipermeable membrane was obtained.

An aqueous sodium hypochlorite solution having a free chlorine concentration of 100 mg/L was continuously supplied to the thus obtained composite semipermeable membrane at a pressure of 1.5 MPa for 15 hours. Thereafter, the membrane was tested at 25° C., pH of 7, and a pressure of 1.5 MPa, using 0.15% salt water as raw water. As a result, the rate of blocking salt was 98.8%. The permeation flux was 0.88 m$^3$/(m$^2$·day).

Example 2-3

An aqueous solution containing 3% by weight of N-benzylethylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 μm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 50.4%. The permeation flux was 0.25 m$^3$/(m$^2$·day). Under the same conditions, a test about ammonium nitrate was made. The blocking rate was 45.2%.

This membrane was immersed into an aqueous sodium hypochlorite solution having a free chlorine concentration of 100 mg/L. After 100 hours, tests were made under the same conditions. As a result, the rate of blocking salt was 61.1%. The permeation flux was 1.06 m$^3$/(m$^2$/day). The rate of blocking ammonium nitrate was 60.1%.

Comparative Example 2-1

In Example 2-1, the test was made without performing the immersion into the aqueous sodium hypochlorite solution. As a result, the rate of blocking salt was 99.3%. The permeation flux was 0.32 m$^3$/(m$^2$·day). It was understood from comparison thereof with Example 2-1 that oxidizer treatment caused an increase in the permeation flux without lowering the salt-blocking rate remarkably.

Comparative Example 2-2

An aqueous solution containing 3% by weight of m-phenylenediamine, 0.15% by weight of sodium laurylsulfate, 3% by weight of triethylamine, and 6% by weight of camphorsulfonic acid was brought into contact with a porous polysulfonic support membrane (average pore size on a thin film formed side: 20 nm, asymmetrical film). Thereafter, an excess of the aqueous solution was removed. Next, an isooctane solution containing 0.2% by weight of trimesic acid chloride was brought into contact with the surface of the support membrane to cause an interfacial condensation polymerization reaction. In this way, a polymer thin film (thickness: 1 µm) was formed on the porous support membrane. Thus, a composite semipermeable membrane was obtained.

The thus obtained composite semipermeable membrane was tested at 25° C., pH of 7, and a pressure of 1.5 MPa, using 0.15% salt water as raw water. As a result, the rate of blocking salt was 99.5%. The permeation flux was 1.1 m$^3$/(m$^2$·day).

The thus obtained composite semipermeable membrane was immersed into an aqueous sodium hypochlorite solution having a free chlorine concentration of 100 mg/L at ambient temperature for 50 hours. Thereafter, the membrane was taken out from this aqueous solution, and tested at 25° C., pH of 7, and a pressure of 1.5 MPa, using 0.15% salt water as raw water. As a result, the rate of blocking salt was 96.2%. The permeation flux was 3.5 m$^3$/(m$^2$·day). It was demonstrated that in the case that m-phenylenediamine was used as the diamine component in this way, the salt-blocking rate of the membrane was markedly lowered by the similar oxidizer treatment.

Comparative Example 2-3

A composite semipermeable membrane was produced in the same way as in Example 2-1 except that diamine component was changed to N-methylethylenediamine. Without performing any oxidizer treatment, a water treatment test was made. As a result, the rate of blocking salt was 83.9%, and the permeation flux was 0.72 m$^3$/(m$^2$·day). The thus obtained composite semipermeable membrane was immersed into an aqueous sodium hypochlorite solution having a free chlorine concentration of 100 mg/L at ambient temperature for 100 hours. Thereafter, the membrane was taken out from this aqueous solution, and tested at 25° C., pH of 7, and a pressure of 1.5 MPa, using 0.15% salt water as raw water. As a result, the rate of blocking salt was 91.3%. The permeation flux was 0.56 m$^3$/(m$^2$·day). In the case that N-methylethyldiamine was used in this way, the salt-blocking rate was slightly increased but the water flux was lowered by the similar oxidizer treatment.

Example 2-4

The composite semipermeable membrane obtained in Example 2-2 was immersed at 40° C. for 3 hours in a solution wherein 0.5% by weight of magnesium chloride was added to an aqueous sodium hypochlorite solution having a free chlorine concentration of 1000 mg/L. Thereafter, the semipermeable membrane was taken out from the aqueous solution, and a test was made at 25° C., pH of 7, and a pressure of 1.5 MPa, using 0.15% salt water as raw water. As a result, the rate of blocking salt was 92.52%. The permeation flux was 0.71 m$^3$/(m$^2$·day).

Example 2-5

The composite semipermeable membrane obtained in Example 2-2 was immersed at 40° C. for 3 hours into a solution wherein 0.5% by weight of magnesium nitrate was added to an aqueous sodium hypochlorite solution having a free chlorine concentration of 1000 mg/L. Thereafter, the semipermeable membrane was taken out from the aqueous solution , and a test was made at 25° C., pH of 7, and a pressure of 1.5 MPa, using 0.15% salt water as raw water. As a result, the rate of blocking salt was 92.28%. The permeation flux was 0.65 m$^3$/(m$^2$·day).

Example 2-6

The composite semipermeable membrane obtained in Example 2-2 was immersed at 40° C. for 3 hours in a solution wherein 0.5% by weight of potassium chloride was added to an aqueous sodium hypochlorite solution having a free chlorine concentration of 1000 mg/L. Thereafter, the semipermeable membrane was taken out from the aqueous solution, and a test was made at 25° C., pH of 7, and a pressure of 1.5 MPa, using 0.15% salt water as raw water. As a result, the rate of blocking salt was 91.86%. The permeation flux was 0.62 m$^3$/(m$^2$·day).

Example 2-7

The composite semipermeable membrane obtained in Example 2-2 was immersed at 40° C. for 3 hours into a solution wherein 0.5% by weight of calcium chloride was added to an aqueous sodium hypochlorite solution having a free chlorine concentration of 1000 mg/L. Thereafter, the semipermeable membrane was taken out from the aqueous solution, and a test was made at 25° C., pH of 7, and a pressure of 1.5 MPa, using 0.15% salt water as raw water. As a result, the rate of blocking salt was 92.21%. The permeation flux was 0.65 m$^3$/(m$^2$·day).

Reference Example 2-1

In Examples 2-4, the semipermeable membrane was immersed into an aqueous sodium hypochlorite solution 40° C. in temperature without adding any inorganic salt. In the same way, tests were made. As a result, the rate of blocking salt was 92%. The permeation flux was 0.5 m³/(m²·day). It was understood from comparison with Example 2-4 that the salt-blocking rate was not markedly lowered and the permeation flux was increased by oxidizer treatment based on the aqueous oxidizer solution containing the metal salt.

INDUSTRIAL APPLICABILITY

The composite semipermeable membrane of the present invention is suitable for the production of ultra pure water, removal of salts from saline water or sea water, and so on, and makes it possible to remove and recollect contaminant sources or effective materials from dirty things, which are causes of the generation of environmental pollution, such as dyeing waste liquid and electrodeposition paint waste liquid, and contribute to the closing of the waster liquid. The membrane can be used for concentration of effective components, and so on for food etc. In particular, the water-treating method in the present invention can be suitably used for purposes producing advantages such that the contamination of the membrane is suppressed by incorporating an oxidizer having a sterilizing effect into raw water. Examples thereof include sterilization of an aseptic water system, removal of activated carbon from a system for producing drinking water, disposal of waste of washing liquid for containers in the food industry, and a system for cleaning up water in a pool.

What is claimed is:

1. A composite semipermeable membrane comprising a porous support membrane and a thin film formed thereon, said thin film comprising a polyamide based resin constituted by a unit obtained by condensation reaction of a diamine component with a non-hetero aromatic polyfunctional acid halide having 2 or more valences, said unit being represented by the following general formulas (I) and/or (II), said polyamide based resin comprising said unit at a ratio of 50% or more by mole:

(I)

wherein $R_{11}$ represents an alkylene group which has 2 to 10 carbon atoms and may contain —O—, —S—, or —NR—, wherein R represents a hydrogen atom or a lower alkyl group, and $R_{12}$ and $R_{13}$ each independently represent an aromatic hydrocarbon group which may have a substituent, or a hydrogen atom, at least one of $R_{12}$ or $R_{13}$ represents an aromatic hydrocarbon group which may have a substituent, and $R_{14}$ represents a bivalent non-hetero aromatic group which may have a substituent, and (II)

wherein $R_{21}$ represents an alkylene group which has 2 to 10 carbon atoms and may contain —O—, —S—, or —NR—, wherein R represents a hydrogen atom or a lower alkyl group, $R_{22}$ and $R_{23}$ each independently represent an aromatic hydrocarbon group which may have a substituent, or a hydrogen atom, at least one of $R_{22}$ or $R_{23}$ represents an aromatic hydrocarbon group which may have a substituent, and $R_{24}$ represents a trivalent non-hetero aromatic group which may have a substituent.

2. The composite semipermeable membrane according to claim 1, wherein the polyamide based resin comprises the unit at a ratio of 80% or more by mole.

3. A composite semipermeable membrane comprising a porous support membrane and a thin film formed thereon, said thin film comprising a polyamide based resin constituted by a unit obtained by condensation reaction of a diamine component with a non-hetero aromatic polyfunctional acid halide having 2 or more valences, said unit being represented by the following general formulas (Ia) and/or (IIa), said polyamide based resin comprising said unit at a ratio of 50% or more by mole:

(Ia)

wherein $R_{31}$ represents an alkylene group which has 2 to 10 carbon atoms and may contain —O—, —S—, or —NR—, wherein R represents a hydrogen atom or a lower alkyl group, $R_{32}$ and $R_{33}$ each independently represent a phenyl group, or a hydrogen atom, at least one of $R_{32}$ or $R_{33}$ represents a phenyl group, and $R_{34}$ represents a bivalent aromatic group which may have a substituent, and

(IIa)

wherein $R_{41}$ represents an alkylene group which has 2 to 10 carbon atoms and may contain —O—, —S—, or —NR— wherein R represents a hydrogen atom or a lower alkyl group, $R_{42}$ and $R_{43}$ each independently represent a phenyl group, or a hydrogen atom, at least one of $R_{42}$ or $R_{43}$ represents a phenyl group, and $R_{44}$ represents a trivalent non-hetero aromatic group which may have a substituent.

4. The composite semipermeable membrane according to claim 3, wherein the polyamide based resin comprises the unit at a ratio of 80% or more by mole.

5. A method for treating a composite semipermeable membrane, comprising bringing a composite semipermeable membrane into contact with an aqueous oxidizer solution along with a metal salt, said composite semipermeable membrane comprising a porous support membrane and a thin film formed thereon, said thin film comprising a polyamide-derived resin comprising at a ratio of 50% or more by mole a constituent unit obtained by condensation reaction of a diamine component with an aromatic polyfunctional acid halide having 2 or more valences, said unit having the formula:

wherein $R^1$ represents a $C_{2-10}$ alkylene group which may contain —O—, —S—, or —NR—, wherein R represents a hydrogen atom or a lower alkyl group; $R^2$ and $R_3$ each independently represent an aromatic hydrocarbon group which may have a substituent, or a hydrogen atom, at least one of $R^2$ or $R_3$ represents an aromatic hydrocarbon group which may have a substituent; and $R_4$ represents a bivalent aromatic organic group which may have a substituent, a trivalent aromatic organic group to which —CO— is attached; or a residue group of a polyfunctional acid halide having 2 or more valences.

6. The method according to claim 5, wherein the contact step is performed by immersing the composite semipermeable membrane into the aqueous oxidizer solution under normal pressure.

7. The method according to claim 5, wherein the contact step is performed by transmitting the aqueous oxidizer solution into the composite semipermeable membrane under applied pressure.

8. The method according to claim 5, wherein the aqueous oxidizer solution is an aqueous sodium hypochlorite solution.

9. A composite semipermeable membrane which is produced by a production process according to claim 5.

10. A water-treating method comprising adding a fungicide to raw water containing salts and/or organic substances; and subjecting the raw water to membrane-separation treatment with a composite semipermeable membrane of claim 9 to obtain permeation water wherein the salts and/or the organic substances are sufficiently removed in practice.

11. The water-treating method according to claim 10, wherein the fungicide is a hypochlorite.

12. The water-treating method according to claim 10, wherein the fungicide is also present, at a concentration having a sufficient sterilizing effect, in the permeation water through the membrane-separation treatment.

13. The water-treating method according to claim 10, wherein the raw water is discharged water after a drinking water container is washed with a washing liquid.

14. The method according to claim 5, wherein the metal salt is selected from the group consisting of alkali metal salts, alkali earth metal salts, and transition metal salts.

15. The method according to claim 5, wherein the metal salt is selected from the group consisting of lithium chloride, potassium chloride, magnesium chloride, magnesium nitrate, calcium nitrate, iron chloride, copper chloride, and calcium chloride.

16. The method according to claim 5, wherein the aromatic polyfunctional acid halide is a non-hetero compound, and $R^4$ represents a non-hetero aromatic organic group.

17. The method according to claim 5, wherein the metal salt is selected from the group consisting of alkali earth metal salts and transition metal salts.

18. The method according to claim 17, wherein the metal salt is selected from the group consisting of magnesium chloride, magnesium nitrate, calcium nitrate, iron chloride, copper chloride, and calcium chloride.

19. The method according to claim 17, wherein the metal salt is selected from the group consisting of magnesium chloride, magnesium nitrate, and calcium chloride.

20. A composite semipermeable membrane comprising a porous support membrane and a thin film formed thereon, said thin film comprising a polyamide-derived resin constituted by a unit obtained by condensation reaction of a diamine component with a non-hetero aromatic polyfunctional acid halide having 2 or more valences, said polyamide-derived resin comprising said unit at a ratio of 50% or more by mole, said unit having the formula:

wherein $R^1$ represents a $C_{2-10}$ alkylene group which may contain —O—, —S—, or —NR—, wherein R represents a hydrogen atom or a lower alkyl group; $R^2$ and $R^3$ each independently represent an aromatic hydrocarbon group which may have a substituent, or a hydrogen atom, at least one of $R_2$ or $R_3$ represents an aromatic hydrocarbon group which may have a substituent; and $R_4$ represents a bivalent non-hetero aromatic organic group which may have a substituent, a trivalent aromatic organic group to which —CO— is attached; or a residue group of a polyfunctional acid halide having 2 or more valences.

21. The composite semipermeable membrane according to claim 20, wherein the aromatic hydrocarbon is a phenyl group.

22. A water-treating method comprising adding a fungicide to raw water containing salts and/or organic substances; and subjecting the raw water to membrane-separation treatment with the composite semipermeable membrane of claim 20 to obtain permeation water wherein the salts and/or organic substances are sufficiently removed in practice.

23. The water-treating method according to claim 22, wherein the fungicide is a hypochlorite.

24. the water-treating method according to claim 22, wherein the fungicide is also present, at a concentration having a sufficient sterilizing effect, in the permeation water through the membrane-separation treatment.

25. The water-treating method according to claim 22, wherein the raw water is discharged water after a drinking water container is washed with a washing liquid.

26. The composite semipermeable membrane according to claim 20, wherein the polyamide based. resin comprises the unit at a ratio of 80% or more by mole.

* * * * *

UNITED STATES PATENT AND TRADEMARK OFFICE
CERTIFICATE OF CORRECTION

PATENT NO. : 7,081,202 B2
APPLICATION NO. : 10/296836
DATED : July 25, 2006
INVENTOR(S) : Tomomi Ohara et al.

It is certified that error appears in the above-identified patent and that said Letters Patent is hereby corrected as shown below:

On Title Page, at Column 2, above item [74] in Assistant Examiner section, after "S" please insert --.--.

On Title Page, at Column 2, in Abstract section, please delete "membrance" and insert --membrane--, therefor.

At Column 1, Line 7 (approximately), please delete "PCT/JP02/02 165," and insert --PCT/JP02/02165.--, therefor.

At Column 4, Line 15, please delete "valences." And insert --valences:--, therefor.

At Column 5, Line 6, please delete "$R_{61}$," and insert --$R_{61}$--, therefor.

At Column 5, Line 59, please delete "(I1Ia)." And insert --(IIIa).--, therefor.

At Column 16, Line 32, please delete "solution ," and insert --solution,--, therefor.

At Column 17, Line 51, in Claim 1, please delete "group,and" and insert --group, and--, therefor.

At Column 19, Line 14 (approximately), in Claim 5, please delete 5 "$R_3$" and insert --$R^3$--, therefor.

At Column 19, Line 16 (approximately), in Claim 5, please delete "$R_3$" and insert --$R^3$--, therefor.

At Column 19, Line 18 (approximately), in Claim 5, please delete "$R_4$" and insert --$R^4$--, therefor.

At Column 20, Line 31 (approximately), in Claim 20, please delete "$R_2$ or $R_3$" and insert --$R^2$ or $R^3$--, therefor.

UNITED STATES PATENT AND TRADEMARK OFFICE
CERTIFICATE OF CORRECTION

PATENT NO. : 7,081,202 B2
APPLICATION NO. : 10/296836
DATED : July 25, 2006
INVENTOR(S) : Tomomi Ohara et al.

It is certified that error appears in the above-identified patent and that said Letters Patent is hereby corrected as shown below:

At Column 20, Line 33 (approximately), in Claim 20, please delete "$R_4$" and insert --$R^4$--, therefor.

At Column 20, Line 49, in Claim 23, please delete "hypochiorite." and insert --hypochlorite.--, therefor.

At Column 20, Line 50 (approximately), in Claim 24, please delete "the" and insert --The--, therefor.

At Column 20, Line 58 (approximately), in Claim 26, please delete "based." and insert --based--, therefor.

Signed and Sealed this

Twenty-fifth Day of December, 2007

JON W. DUDAS
*Director of the United States Patent and Trademark Office*